Sept. 19, 1939.  C. T. OLSON  2,173,561
TAKE-UP DEVICE FOR ANTIFRICTION BEARINGS
Filed Sept. 24, 1937
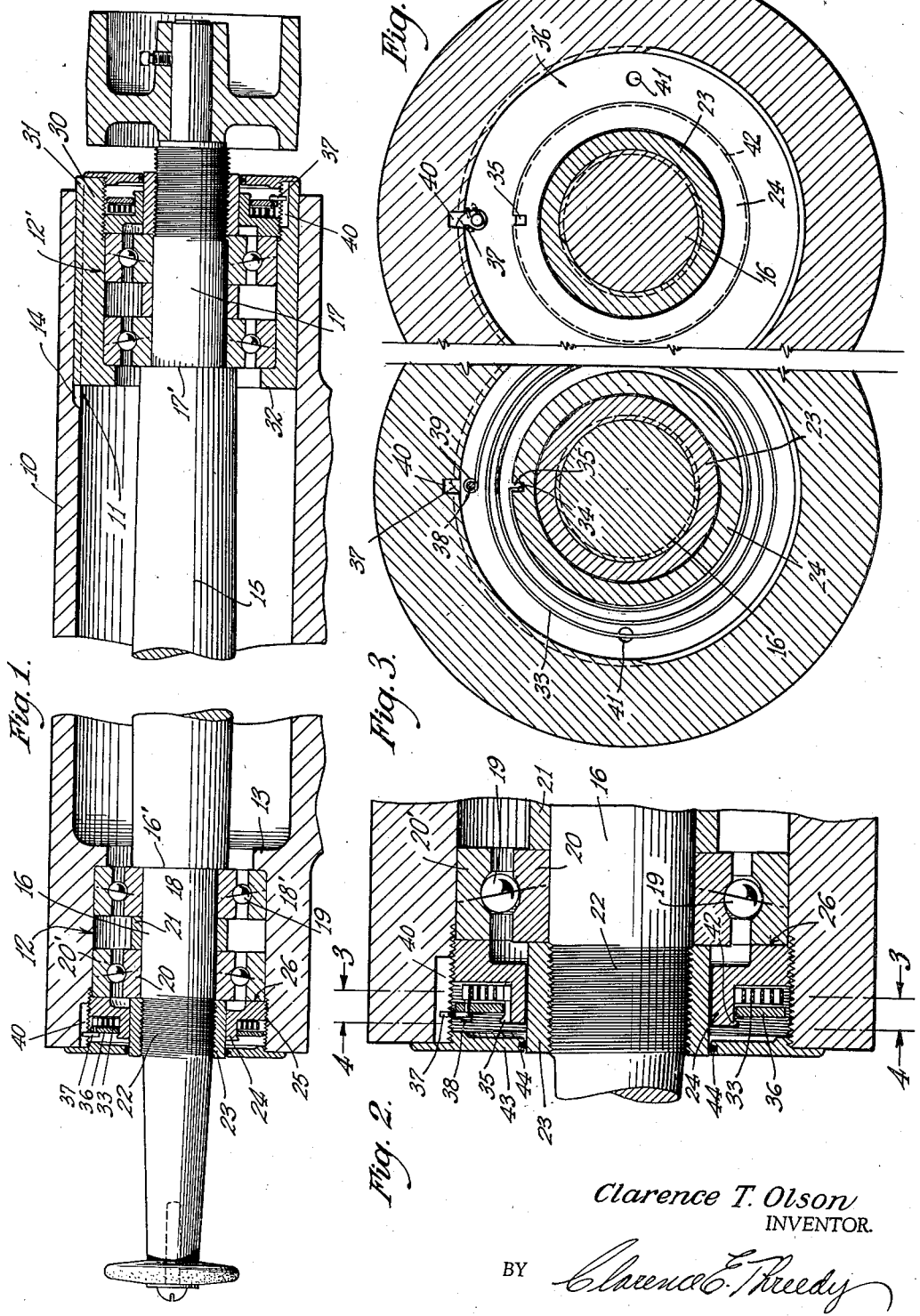
Clarence T. Olson
INVENTOR.
BY Clarence E. Threedy
HIS ATTORNEY.

Patented Sept. 19, 1939

2,173,561

UNITED STATES PATENT OFFICE 2,173,561

TAKE-UP DEVICE FOR ANTIFRICTION BEARINGS

Clarence T. Olson, Chicago, Ill.

Application September 24, 1937, Serial No. 165,443

6 Claims. (Cl. 308—189)

This invention relates to automatic take-up means for anti-friction bearings so as to compensate for axial and radial play and thereby maintain the bearings in proper alignment.

Among the important objects, the invention includes the provision of novel means for automatically taking up the play existing in new anti-friction bearing structures. Another object of this invention is to provide automatic means for taking up both radial and axial play that develops from wear of the ball or roller bearing structures.

It is a well known fact that anti-friction bearings when new and unused have a certain amount of radial and axial play caused by clearances existing between the roller members and the raceways. To this end it is to be noted that the first object of the new automatic take-up means is to take up such radial and axial play which is known to be detrimental in high speed applications such as grinding wheel spindles.

In conjunction with the last-named object, it is a further object of the new automatic take-up means to take up any play due to wear by entrance of abrasives into the bearing housing, which play develops as the bearing structure is in use, it being particularly noted that such axial and radial play caused by wear is taken up by the means provided by this invention simultaneously with the wear as said play is created.

A further object of the invention is the provision of a housing and roller bearing means in the housing, and including a stationary race and a movable race carried on a spindle and a collar threadable into the housing to bear against the stationary race, together with spring means associated with the collar and normally tending to rotate the latter to thread the same against the stationary race.

A further object is the provision of a take-up device of the type described, and which further includes manually adjustable means for winding the take-up spring to facilitate installation and takeup of the bearing structure.

Still another object is the provision of a bearing structure especially suitable for use with high speed tools such as grinding devices, and which includes a support or arbor having two spaced apart bearing units, one of the same being substantially fixed relative to the arbor or support, and the other being slidable in a direction axially of the spindle to compensate for expansion and other axial dimensional variations of the bearing structure; automatic takeup means being provided for both the fixed and the slidable bearing units.

Yet another object is the provision of a bearing device of the class described, and which includes a relatively stationary bearing race and a movable race on a spindle, a take-up collar threaded into the bearing support against the stationary race and urging the latter axially inward of the spindle, together with a clock spring surrounding the spindle and constantly tending to rotate the take-up collar so as to thread the same against the stationary race and thus automatically compensate for wear, the threaded engagement between the take-up collar and the bearing support being further operative to withstand and compensate sudden thrust or radial loads.

Other objects and novel aspects of the invention will appear as the following description proceeds in view of the drawing, in which:

Fig. 1 is a vertical section through a bearing support or arbor;

Fig. 2 is a fragment of an enlarged vertical section of one of the bearings of Fig. 1;

Fig. 3 is an enlarged lateral section of one of the bearings of Fig. 1 and taken along lines 3—3 of Fig. 2; while Fig. 4 is another lateral section taken along lines 4—4 of Fig. 2 oppositely to that of Fig. 3.

Referring to Fig. 1, a preferred embodiment of the invention includes an elongated spindle support or sleeve 10 preferably having a large central cut-out portion 11 flanked at either end by bearing chambers or housings 12 and 12", the former being separated from the central portion 11 by a shoulder or collar formation 13, while the housing or chamber 12' at the opposite (right) end of the arbor is of uniform bore and is provided with an axially extended keyway 14, the purpose of which will later be described.

The device illustrated is a high sped grinding tool, and includes a spindle 15 having reduced opposite end portions 16 and 17 each providing a collar portion 16' and 17', respectively, on either side of the central portion of the spindle and between its opposite ends.

The reduced shaft portion 16 at the left end of the spindle in Fig. 1 is seated in a pair of bearings which include an inner bearing comprising an inner race 18 and an outer race 18', the former being termed for convenience herein the movable race, and the latter the stationary race, there being the usual roller bearing elements 19 between these races.

The outer bearing unit is substantially identical with the inner unit, and includes an inner movable race 20 and an outer stationary race 20' with the usual bearing balls disposed therebetween. The inner race 18 of the inner bearing unit bears against the shoulder portion 16' of the left spindle shaft, while the inner or movable race of the outer bearing unit is separated from the innermost movable race 18 by a collar 21.

Between the shoulder 16' and the left end of the spindle shaft is a threaded portion 22 onto which is threaded a locking collar 23 which bears firmly against the movable race 20 of the outermost bearing unit and urges the same against the collar 21 and the inner bearing race 18, thus firmly securing the inner and movable bearing races on the spindle.

Fitted over the locking collar 23 is a take-up collar 24 freely rotatable about the locking collar and having threaded engagement, as at 25, with the bearing housing or chamber 12 of the arbor or support, the innermost axial end 26 of this take-up collar bearing against the outer axial end of the outer stationary bearing race 20 in a manner to urge the latter in an inward axial direction, so that it will be apparent that by threading the take-up collar 24 into the housing or bearing chamber, both of the so-called bearing races will be shifted axially relative to the movable races on the spindle, and in this manner all radial and axial play between the stationary and movable races of each of the bearing units may be taken up. To this extent the construction of the bearing units at both the left- and right-hand ends of the spindle, as seen in Fig. 1, are identical.

However, attention is called to the fact that the right-hand bearing assembly is installed in a movable housing sleeve 30 having an axially extended key 31 slidable in the keyway 14 heretofore mentioned, the innermost axial end of this housing sleeve having a collar formation 32 corresponding generally to the formation 13 in the left-hand bearing assembly.

As will be seen particularly in Fig. 2, the take-up collar 24 has a neck 24' which extends slightly toward the outer axial end of the spindle, and surrounding this neck portion 24' is an urging device in the form of a clock spring 33 having one of its ends 34 bent back and fitted into a slot 35 in the neck part 24' of the take-up collar. Fitted over the take-up collar is a stationary plate 36 which is otherwise free to rotate about the collar but which is prevented from rotating by a stopping dog 37 pivoted near the outer periphery of the plate on a pin 38 which extends on through the plate and engages the other end portion 39 of the spring 33.

A notch 40 is provided in the inner periphery of both of the fixed housing members 12 and 30 for the reception of the dogs 37 (Fig. 4), whereby the plates 36 are held immovable relative to their respective take-up collars 26 so that the springs 33 can exert a force between the plate 36 and the collar 26 and rotate the latter in a direction to thread the same into the housing and against the stationary bearing races in the manner aforesaid.

Each of the stationary end plates 36 is provided with an opening 41 into which a suitable tool may be fitted so as to rotate the plate in one direction (anti-clockwise in Fig. 4) when the bearing assembly is installed. To prevent removal of the end plates 36, each of the neck portions 24' of the take-up collars is preferably flared or peened as at 42 (Fig. 2), and when the bearing unit has been installed, a cover plate 43 may be threaded into the housing, and this plate is preferably provided with a felt washer structure 44 which effectively seals any opening between the locking collar 23 and the end plate 43 and prevents grindings from entering the bearing chamber.

With the exception of the heretofore mentioned slidable feature of the right-hand bearing chamber 30, the bearing assemblies of the right- and left-hand portions of Fig. 1 are identical. The right-hand bearing sleeve 30, however, is arranged for axial movement by means of the keyway and key 14—31 so that the entire right bearing unit can shift inwardly or outwardly of the arbor or support 10 responsive to expansion or contraction of the several members of the bearing structure.

Attention is called to the dotted line representations in Figs. 1 and 2 indicating the angle of contact of the rolling elements between the raceways caused by the take-up device. Forcing the rolling elements into this angularity of contact causes all radial and axial play between rolling elements and raceways to be taken up. Experience shows that even the most carefully constructed bearings, whether operated at high or low speeds, eventually develop more or less radial and axial play, and the higher the speed of operation of the driven shaft, the sooner this play appears and the greater and more deleterious its effect.

In the device herein illustrated, the grinding spindle 15 is intended to be driven at very high speeds, and in this class of tool serious difficulty has heretofore been encountered in maintaining the bearings in proper alignment, various and elaborate mechanisms having been devised to this end without providing a practical solution to the problem. The improved and simply constructed take-up device of my invention overcomes all of these difficulties effectively and efficiently, and dispenses with any necessity for constant attention and expert alignment of the bearings.

It will be apparent that various arrangements and modifications may be made in the specific embodiments set forth for the purposes of illustration, and it is therefore my intention to include in the appended claim all such modifications, rearrangements and combinations of the device as may occur to those skilled in the art and come fairly within the sphere of the invention.

Having thus described my invention, what I claim as new and desire to protect by Letters Patent is:

1. An anti-friction bearing structure including a housing having an axial bore, a spindle extended into said bore, spaced apart inner bearing races secured on said spindle and each having a cooperating stationary race, ball bearing elements between said inner and stationary races, said bore having abutment means against which the innermost one of said sstationary races bears, and a take-up collar threaded into said bore against the outermost one of said stationary races, a coil spring having one end attached to said take-up collar and its opposite end attached to a plate member movably fitted on to said collar for rotation relative thereto about the rotational axis of said spindle to tension said spring and thereby urge said take-up collar threadably into said bore, said plate member having means automatically operable to lock the same against retrograde movement when said spring has been tensioned.

2. In an automatic bearing take-up, tensioning means for cooperation with a take-up collar which threads into a bore against a bearing to take up play, said tensioning means comprising: a tensioning collar rotatable coaxially of said bore therein, spring means coacting with said take-up collar and said tensioning collar for tensioning by rotative movement of the latter in one direction to actuate said take-up collar, and detent means arranged for coaction with said tensioning collar to automatically latch the same against retrograde movement by said spring means in an opposite direction when the spring means is tensioned as aforesaid.

3. In an anti-friction bearing, a housing, a spindle in said housing, adjustable bearing means for said spindle in said housing, and automatic take-up means including a collar threaded into the housing co-axially of said spindle and having bearing engagement with said adjustable bearing means, spring means around said collar and operably connected therewith to thread the same into the housing and against said adjustable bearing means, tensioning means arranged for movement co-axially of said spindle and arranged for manual movement in a given direction to tension said spring means, and releasable means actuated automatically by tensioning movement of said tensioning means to prevent retrograde movement of said tensioning means.

4. A device of the class described comprising a sleeve cartridge adapted to fit around a spindle into a spindle support, bearing means supportably engaging said spindle in said sleeve, and a take-up collar arranged for threaded movement into said sleeve for cooperation with said bearing means to take up play thereof, spring means in said sleeve and operatively connected with said take-up collar for tensioning so as to urge the take-up collar in take-up movement, and means for tensioning said spring means including a tensioning member arranged for rotative movement about said spindle and having operative connection with said spring means to tension the same when the tensioning member is turned in a particular direction, together with restraining means arranged in said sleeve for coaction with said tensioning member to automatically restrain the same against retrograde movement in an opposite direction when the spring means is tensioned as aforesaid.

5. In a device of the class described, coacting concentric bearing members arranged on a spindle, said bearing members having limited play in an axial direction, means on said spindle against which the inner one of said bearing members may be urged to secure the same for rotation with the spindle, a locking collar threaded onto said spindle against said inner bearing member to urge the same in a direction against said means securing the same for rotation with the spindle, means providing a housing substantially surrounding said bearing means on the spindle, a take-up collar threaded into said housing concentrically of said locking collar so as to bear against the outer one of said bearing members to take up said play, spring means arranged concentrically of said locking collar and having one end portion connected with said take-up collar and an opposite end portion connected to a tensioning disc fitted into said housing for rotative movement concentrically of said spindle, said tensioning disc being turned in a particular direction to tension said spring means and effect take up operation of the take-up collar, and detent means on said tensioning disc and automatically engageable with a part in said housing to latch the disc against retrograde movement when the spring means has been tensioned.

6. In an automatic take-up bearing, a cartridge sleeve adapted to fit removably into a spindle support and having a bore surrounding the spindle, said spindle having an abutment shoulder, a first bearing means fitted onto said spindle against said shoulder, and a second bearing means cooperable with said first bearing member and having limited axial play relative thereto, means securing said first bearing means against movement relative to the spindle, a take-up collar threaded into said sleeve about said spindle to bear against said second bearing means and move the same axially to take-up play, spring means arranged in said sleeve with one end operatively connected with said take-up collar and an opposite end portion secured to a tensioning member arranged for free rotation about said spindle in said sleeve in a direction to tension said spring and threadably urge said collar against said second bearing means, and detent means coacting with said tensioning member and sleeve to automatically latch the collar against retrograde movement when the spring means has been tensioned as aforesaid.

CLARENCE T. OLSON.